United States Patent
Decoster

(10) Patent No.: US 7,536,920 B2
(45) Date of Patent: May 26, 2009

(54) SEAT OCCUPANCY DETECTOR

(75) Inventor: Yves Decoster, Ethe (BE)

(73) Assignee: IEE International Electronics & Engineering S.A. (LU)

( * ) Notice: Subject to any disclaimer, the term of this patent is extended or adjusted under 35 U.S.C. 154(b) by 104 days.

(21) Appl. No.: 10/579,527

(22) PCT Filed: Nov. 12, 2004

(86) PCT No.: PCT/EP2004/052950

§ 371 (c)(1),
(2), (4) Date: May 15, 2006

(87) PCT Pub. No.: WO2005/047067

PCT Pub. Date: May 26, 2005

(65) Prior Publication Data

US 2007/0125586 A1    Jun. 7, 2007

(30) Foreign Application Priority Data

Nov. 14, 2003  (EP) ................. 03104207

(51) Int. Cl.
G01B 7/16 (2006.01)
G08B 23/00 (2006.01)
(52) U.S. Cl. .................... 73/781; 340/573.1
(58) Field of Classification Search .......... 340/666, 340/667, 573.1, 665; 180/273; 119/112, 119/139; 73/760, 763, 768, 771, 772, 781
See application file for complete search history.

(56) References Cited

U.S. PATENT DOCUMENTS 5,446,452 A * 8/1995 Litton ............... 340/870.17
5,612,876 A * 3/1997 Zeidler et al. ............ 701/45
5,900,808 A * 5/1999 Lebo .................... 340/442
5,957,491 A   9/1999 Cech et al.
6,868,734 B2 * 3/2005 Jakoby et al. ............. 73/781
7,151,455 B2 * 12/2006 Lindsay et al. ........ 340/572.3

(Continued)

FOREIGN PATENT DOCUMENTS

AU        728312     * 12/1998

(Continued)

OTHER PUBLICATIONS

Abstract of JP 8087557.*

(Continued)

Primary Examiner—Harshad Patel
Assistant Examiner—Punam Patel
(74) Attorney, Agent, or Firm—Cantor Colburn LLP

(57) ABSTRACT

A seat occupancy sensor comprises a pressure detection device associated with a surface of a seat and a control unit for communicating with the pressure detection device. According to the invention the pressure detection device comprises a surface acoustic wave device including at least one surface acoustic wave resonator and an antenna and the control unit comprises an RF antenna for remotely communicating with said surface acoustic wave device. In a first embodiment, the surface acoustic wave is adapted for detecting the pressure inside a sealed chamber. In a second embodiment, a pressure sensitive switching device is connected to the surface acoustic wave device so as to activate the surface acoustic wave device when the pressure sensitive switching device is triggered.

7 Claims, 1 Drawing Sheet

U.S. PATENT DOCUMENTS

2003/0098792 A1* 5/2003 Edwards et al. .......... 340/573.1
2004/0215382 A1* 10/2004 Breed et al. ................... 701/45

FOREIGN PATENT DOCUMENTS

| DE | 101 44 877 | 4/2003 |
| EP | 0 900 705 | 3/1999 |
| JP | 57 029916 | 2/1982 |

OTHER PUBLICATIONS

R. Steindl, A. Pohl, F. Seifert, "Impedance loaded SAW-sensors offer a wide range of measurement opportunities," in Prcoc. IEEE MTT-S, Anaheim, CA 1999, pp. 1453-1456. Accessed online <http://ieeexplore.ieee.org/iel5/6330/16934/00780223.pdf>.*

International Search Report; PCT/EP2004/052950; Jan. 28, 2005.

* cited by examiner

SEAT OCCUPANCY DETECTOR

TECHNICAL FIELD OF INVENTION

The present invention generally relates to a seat occupancy detector e.g. for use in an automotive vehicle.

BRIEF DESCRIPTION OF RELATED ART

In modern vehicles, seat occupancy sensors are widely used in order to detect whether a passenger seat is occupied or not. The information about the occupancy of the passenger seat may then be used in order to control the deployment of one or more airbags associated to the passenger seat (the deployment is e.g. inhibited if the passenger seat is found to be non occupied) or in the triggering of a seat belt reminder.

The occupancy sensors usually comprise pressure sensing devices integrated in the respective passenger seat for detecting a pressure induced by the presence of a passenger into the seat. The pressure sensing devices, as e.g. disclosed in DE-A-42 37 072, comprise a plurality of individual force sensors, which are connected in a suitable manner to a control unit designed for measuring a pressure depending electrical property of said individual pressure sensors.

These occupancy sensors have proven to be very reliable and well adapted to the detection of seat occupancy. However one drawback of these occupancy sensors lies in the fact, that the pressure sensing device has to be physically connected to the control unit by means of connection wires in order to be functional. This need for physically connecting the sensing device to the control unit causes problems in modern cars equipped with a flexible seating system with removable and/or displaceable back seats.

Document DE-A-101 44 877 discloses an occupancy sensor, which does not need to be physically connected to the control unit. The occupancy sensor comprises a surface acoustic wave device (SAW device), which is integrated into a seating surface. The SAW device is used for pressure measurement and for remotely transmitting pressure related data to the control unit.

BRIEF SUMMARY OF INVENTION

The invention provides a different seat occupancy sensor which is not depending on a physical connection between the pressure sensing device and the control unit.

The invention proposes a seat occupancy sensor, comprising at least one pressure detection device associated with a surface of a seat and a control unit for communicating with the pressure detection device. According to the invention said pressure detection device comprises a surface acoustic wave device including at least one surface acoustic wave resonator and an antenna and said control unit comprises an RF antenna for remotely communicating with said surface acoustic wave device. Furthermore said pressure detection device comprises a dedicated pressure sensor, said dedicated pressure sensor being electrically connected to said surface acoustic wave device so as to activate said surface acoustic wave device when said dedicated pressure sensor is triggered.

A surface acoustic wave resonator comprises a piezoelectric substrate with metallic structures (interdigital transducers) on its plain-polished surface. Due to piezoelectricity an electric signal at the interdigital transducers will stimulate a surface acoustic wave on the surface of the substrate. Vice versa a surface acoustic wave generates an electric charge distribution at the receiving interdigital transducers which is measurable as an electric signal. In case of a one port surface acoustic wave resonator only one interdigital transducer is connected electrically while the other interdigital transducers are reflective. If the interdigital transducer is connected to an antenna, the element is operable as a passive wirelessly interrogable system.

As the velocity of the surface acoustic wave travelling along the surface of the piezoelectric substrate is depending inter alia on the environmental conditions at the sensor surface, the response of the surface acoustic wave devices depends on the environmental conditions. Thus the surface acoustic wave devices may be used to measure environmental conditions such as pressure, temperature, etc.

The surface acoustic wave resonator is connected to a miniaturized antenna so that the surface acoustic wave device acts as a resonator. If a radio frequency (RF) signal is sent to the surface acoustic wave device, the surface acoustic wave resonator oscillates at a frequency, which is depending on the given environmental condition in the vicinity of the surface acoustic wave device. The response signal of the surface acoustic wave device, which is wirelessly transmitted back to the control unit, may be processed in to control unit in order to extract the information about the measured condition.

The remote operability of the surface acoustic wave device enables the seat occupancy sensor to be remotely operated and interrogated without the need for cabling between the pressure detection device and the control unit. Thus the seat occupancy status may be detected for all seats in a car without affecting the flexibility of a seating system with removable and/or displaceable back seats.

It will be noted, that a single control unit may be used for operating and interrogating several pressure detection devices arranged in different seats of the car. In a possible embodiment, the RF antenna of the control unit may be arranged in a region of the car, where communication is possible with surface acoustic wave devices as well in the front seats as in the rear seats. It will be appreciated, that in this case each of the surface acoustic wave devices associated to the different seats preferably operates in a different oscillating frequency range in order to be selectively addressable. Alternatively or additionally a radio frequency tag may be integrated in each of the surface acoustic wave devices in order to ensure the addressability of each device.

It will be noted that surface acoustic wave devices are totally passive sensor devices which do not require a dedicated power supply. Thus there is no need to provide a battery power for the surface acoustic wave device of the seat occupancy sensor of the present invention to be operable. Furthermore, surface acoustic wave devices are characterized by their small size, low cost and rigged construction.

According to the invention, the pressure detection device comprises besides the surface acoustic wave device, a dedicated pressure sensor, which is associated to the surface acoustic wave device. In this embodiment, the dedicated pressure sensor, which may be of any suitable type for use in a vehicle seat, is solely responsible for the pressure detection, while the surface acoustic wave device is used for the remote transmission of the respective pressure signal. In a preferred embodiment, said dedicated pressure sensor comprises a pressure sensitive switching device, said pressure sensing switching device being electrically connected to said surface acoustic wave device so as to activate said surface acoustic wave device when said pressure sensitive switching device is triggered. In this embodiment of the invention, the detection of seat occupancy is achieved by the pressure sensitive switching device and the corresponding information is transmitted to the control unit using the surface acoustic wave device's capability to remotely communicate with the control unit.

In a possible embodiment of this variant, the pressure sensitive switching device may have an electrical property (e.g. resistance) which varies depending on the pressure acting on the pressure sensitive switching device. Such a pressure transducer device may then be connected to the surface acoustic wave resonator in such a way, that the resonance frequency of the device is modulated by electrical property value of the pressure sensitive device.

In a preferred embodiment of the invention, the pressure sensitive switching device is connected in series between the surface acoustic wave resonator and the antenna. It follows that the pressure sensitive switching device acts as a switch for establishing an electrical connection between the surface acoustic wave resonator and the antenna. The surface acoustic wave device accordingly is only activated if the connection between the surface acoustic wave resonator and the antenna is established. The pressure sensitive switching device thus should be designed so as to close the electrical contact between the surface acoustic wave resonator and the antenna if a passenger is occupying the seat. The pressure sensitive switching device may e.g. comprise a foil-type switching device, which is integrated into the seat. These foil-type switching devices are well known in the art and are available as simple switches or as pressure transducers.

In the absence of a seat occupant, the pressure sensitive switching device is not triggered and the surface acoustic wave device is accordingly not active. Thus the control unit does not receive a signal from the surface acoustic wave device. On the contrary, if an occupant is present, the switching device is triggered and the electrical contact between the surface acoustic wave resonator and the antenna is established. The control unit thus will receive a response signal from the surface acoustic wave device. In this embodiment of the invention, the presence or the absence of a response signal of the surface acoustic wave device gives the occupant detection information to the control unit.

In order to increase the active area of the seat occupancy sensor, the pressure sensitive switching device preferably comprises a plurality of individual pressure sensors or switches arranged at different locations with respect to the seat surface. The different individual pressure sensors may for instance be distributed over the seating surfaces of the seat so as to ensure detection of a passenger even in case of an out of position occupancy. The skilled person will appreciate that there exist different possibilities to connect the different individual pressure sensors between the surface acoustic wave resonator and the antenna.

The surface acoustic wave device of the present variant of the invention may be solely used in order to transmit he occupancy information to the control unit. However in a preferred embodiment, the surface acoustic wave is preferably adapted for the measurement of the temperature inside the seat, thus allowing for temperature compensation of the occupancy information. In this embodiment, the surface acoustic wave device accordingly comprises at least one acoustic wave resonator adapted for temperature measurement. Said surface acoustic wave resonator is e.g. able to oscillate at a given frequency depending on the temperature inside the sealed chamber.

It will be appreciated that the present invention proposes a very flexible, robust and low cost seat occupancy sensor, which is suitable for wirelessly detecting seat occupancy for all of the seats of a vehicle. Furthermore it will be noted that the seat occupancy sensor of the present invention may be used for different applications such as airbag deactivation (if a passenger seat is not occupied), seat belt reminders or others.

BRIEF DESCRIPTION OF THE DRAWINGS

The present invention will be more apparent from the following description of several not limiting embodiments with reference to the attached drawings, wherein.

DETAILED DESCRIPTION OF THE INVENTION

Figure 1:
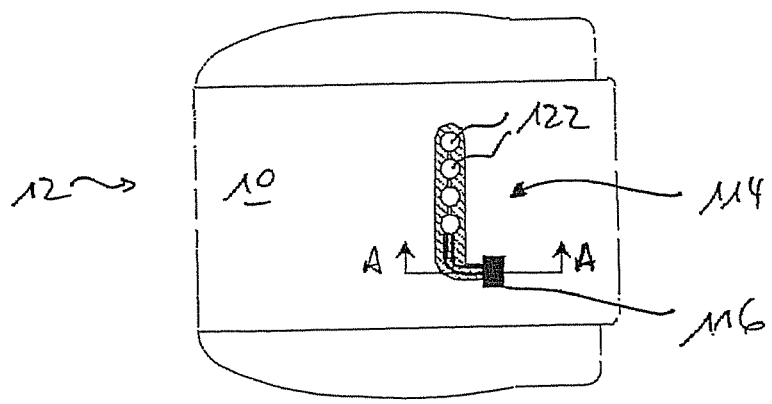
FIG. 1: a top view of a vehicle seat seating surface with an embodiment of a seat occupancy sensor.

FIG. 1 shows a top view on a seating surface 10 of a vehicle seat 12. A pressure detection device 114 is associated with the seating surface 10. In the shown example, the pressure detection device 114 is integrated in the car seat between the trim 16 and the seat foam 18.

Further to the surface acoustic wave resonator 28, the surface acoustic wave device may comprise a second surface acoustic wave resonator 36 dedicated to the temperature measurement. As for the first resonator 28, the main interdigital transducer of resonator 36 is coupled to antenna 30 of the surface acoustic wave device 26. If a radio frequency signal at a frequency $f_1$ is emitted by the remote control unit 34, the signal is received by the surface acoustic wave resonator 36 via antenna 30. The surface acoustic wave resonator 36 oscillates with a frequency $f_1 + \Delta f_1$, where $\Delta f_1$ is e.g. proportional to the local temperature. This resonance frequency is sent back to and received by the control unit for data processing.

The pressure detection device 114 comprises a pressure sensitive switching device 120, which is associated with the seating surface 10 of the seat 12. The pressure sensitive switching device 120 may e.g. be integrated into the seat between the seat trim 16 and the seat foam 18. Alternatively the pressure sensitive switching device 120 may be integrated into the seat foam 18.

The pressure sensitive switching device 120 may comprise a simple membrane switching device or a pressure transducer. Preferably the pressure sensitive switching device 120 comprises several pressure sensitive switches or sensors 122, which are suitably distributed over the seating surface in order to increase the active area of the pressure sensitive switching device 120.

The pressure sensitive switching device 120 is connected to a surface acoustic wave device 126 in such a way as to activate said surface acoustic wave device 126 when one or more of said switches or sensors 122 of said pressure sensitive switching device 120 is triggered by an occupant 32.

Figure 2:
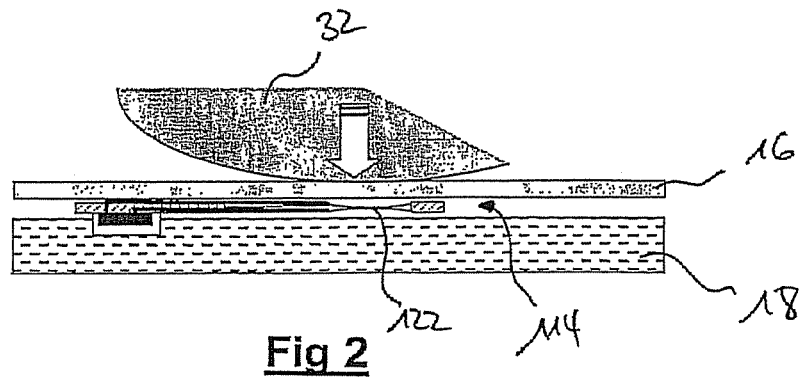
FIG. 2: a section view of the seat occupancy sensor along the line A-A of FIG. 14.

Further to a surface acoustic wave resonator 136, the surface acoustic wave device 126 comprises a miniaturized antenna 130, which is connected to an interdigital transducer (not shown) of the surface acoustic wave resonator 136. This antenna enables the surface acoustic wave device to remotely and wirelessly communicate with a control unit 34 (not shown in FIGS. 1 and 2) including an RF antenna 38. The RF antenna 38 of the control unit 34 is preferably arranged inside the vehicle at a location, at which the RF antenna "sees" the antennas 30 of different surface acoustic wave devices arranged in different vehicle seats.

In the shown embodiment, the pressure sensitive switching device 120 is connected in series between the surface acoustic wave resonator 136 and the antenna 130 of the surface acoustic wave device 126. It follows that the pressure sensitive switching device 120 acts as a switch for establishing an electrical connection between the surface acoustic wave resonator 136 and the antenna 130. Accordingly the surface acoustic wave device 126 is only activated if the pressure sensitive switching device 120 is triggered by the presence of an occupant on the seat.

In the absence of a seat occupant, the pressure sensitive switching device 120 is not triggered and the surface acoustic wave device 126 is not active. Thus the control unit 34 does not receive a signal from the surface acoustic wave device. On the contrary, if an occupant 32 is present, the switching device 120 is triggered and the electrical contact between the surface acoustic wave resonator 136 and the antenna 130 is established. The control unit 34 thus will receive a response signal from the surface acoustic wave device 126. The presence or the absence of a response signal of the surface acoustic wave device thus gives the occupant detection information to the control unit.

Surface acoustic wave resonator 136 may be solely used for its wireless communication capabilities. In this case, if the pressure sensitive switching device 120 is triggered and if a radio frequency signal with a frequency $f_1$ is emitted by the remote control unit 34, the signal is received by the surface acoustic wave resonator 136 via antenna 130. The resonator then oscillates with a given frequency $f_1$ which is sent back to the control unit 34 if one or several switches 122 are activated.

Figure 3:
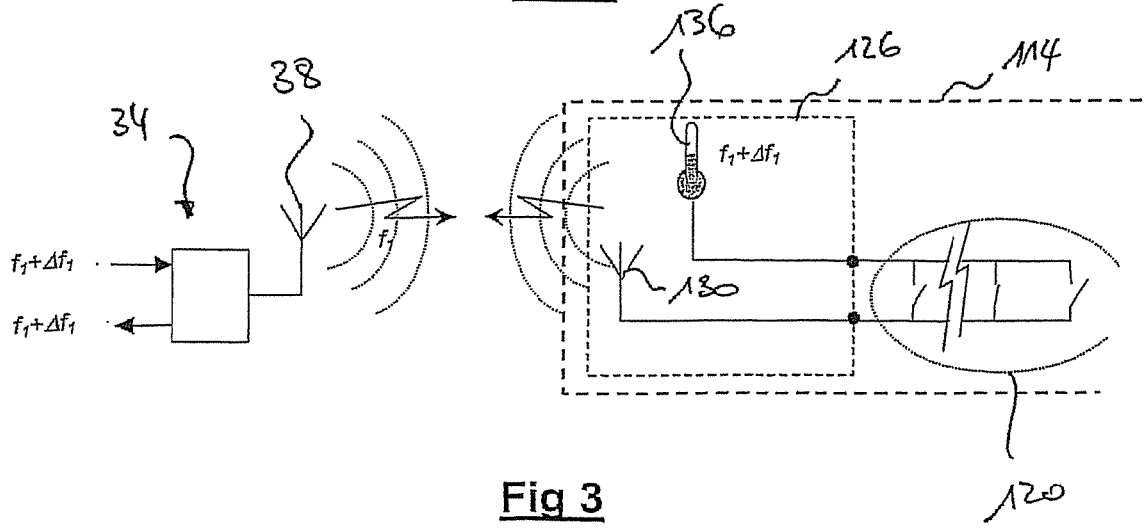
FIG. 3: a schematic view of the operation of the occupancy sensor of FIG. 1.

In the preferred embodiment shown in FIG. 3, the surface acoustic wave resonator 136 is designed for temperature measurement. In response to an excitation field with frequency $f_1$ the resonator 136 then oscillates with a frequency $f_1 + \Delta f_1$ where $\Delta f_1$ is e.g. proportional to the local temperature. This frequency $f_1 + \Delta f_1$ is sent back to and received by the control unit for data processing. After extraction of the temperature information, the sensed temperature may then be used for temperature calibration of the pressure sensitive switching device 120.

The invention claimed is:

1. A seat occupancy sensor, comprising at least one pressure detection device associated with a surface of the seat and a control unit for communicating with the pressure detection device, Wherein said pressure detection device comprises a surface acoustic wave device including at least one surface acoustic wave resonator and an antenna and wherein said control unit comprises an RF antenna for remotely interrogating and communicating with said surface acoustic wave device, wherein said pressure detection device further comprises a dedicated pressure sensor, said dedicated pressure sensor being electrically connected to said surface acoustic wave device so as to activate said surface acoustic wave device when said dedicated pressure sensor is triggered.

2. Seat occupancy sensor according to claim 1, wherein said dedicated pressure sensor comprises a pressure sensitive switching device, said pressure sensing switching device being electrically connected to said surface acoustic wave device so as to activate said surface acoustic wave device when said pressure sensitive switching device is triggered.

3. Seat occupancy sensor according to claim 2, wherein said pressure sensitive switching device comprises a plurality of individual pressure sensors or switches arranged at different locations with respect to the seat surface.

4. Seat occupancy sensor according to claim 1, wherein said surface acoustic wave device comprises at least one acoustic wave resonator adapted for temperature measurement.

5. Seat occupancy sensor, comprising at least one pressure detection device associated with a surface of a seat and a control unit for communicating with the pressure detection device, wherein said pressure detection device comprises a surface acoustic wave device including at least one surface acoustic wave resonator and an antenna and wherein said control unit comprises an RF antenna for remotely interrogating and communicating with said surface acoustic wave device, wherein said pressure detection device further comprises a dedicated pressure sensor, said dedicated pressure sensor being electrically connected to said surface acoustic wave device so as to activate said surface acoustic wave device when said dedicated pressure sensor is triggered, wherein said dedicated pressure sensor comprises a pressure sensitive switching device, said pressure sensing switching device being electrically connected to said surface acoustic wave device so as to activate said surface acoustic wave device when said pressure sensitive switching device is triggered, and wherein said pressure sensitive switching device is connected in series between the surface acoustic wave resonator and the antenna.

6. Seat occupancy sensor according to claim 5, wherein said pressure sensitive switching device comprises a plurality of individual pressure sensors or switches arranged at different locations with respect to the seat surface.

7. Seat occupancy sensor according to claim 5, wherein said surface acoustic wave device comprises at least one acoustic wave resonator adapted for temperature.

* * * * *